United States Patent [19]

Yasuda et al.

[11] Patent Number: 4,786,542

[45] Date of Patent: Nov. 22, 1988

[54] SETTERS AND FIRING OF CERAMIC HONEYCOMB STRUCTURAL BODIES BY USING THE SAME

[75] Inventors: Keiji Yasuda, Aichi; Kazuhiro Miyahara, Nagoya, both of Japan

[73] Assignee: NGK Insulators, Ltd., Nagoya, Japan

[21] Appl. No.: 15,986

[22] Filed: Feb. 18, 1987

[30] Foreign Application Priority Data

Feb. 20, 1986 [JP] Japan .................................. 61-33714
Feb. 20, 1986 [JP] Japan .................................. 61-33715

[51] Int. Cl.$^4$ .............................................. B32B 3/12
[52] U.S. Cl. ..................................... 428/116; 156/89; 502/527
[58] Field of Search .................. 156/89; 428/116, 118; 502/527

[56] References Cited

U.S. PATENT DOCUMENTS

| | | | |
|---|---|---|---|
| 3,904,352 | 9/1975 | Thurnauer et al. | 264/58 X |
| 4,014,968 | 3/1977 | Simon | 264/56 |
| 4,091,945 | 5/1978 | Patterson | 206/322 X |
| 4,191,583 | 3/1980 | Armistead et al. | 501/9 |
| 4,219,344 | 8/1980 | Armistead et al. | 65/18.1 |
| 4,552,852 | 11/1985 | Manning | 264/66 X |
| 4,557,773 | 12/1985 | Bonzo | 156/64 |
| 4,619,909 | 10/1986 | Ono et al. | 502/304 X |

FOREIGN PATENT DOCUMENTS

| | | | |
|---|---|---|---|
| 1808143 | 6/1970 | Fed. Rep. of Germany | 428/178 |
| 3337875 | 4/1985 | Fed. Rep. of Germany | 428/118 |
| 50-26146 | 3/1975 | Japan | 428/116 |
| 60-89516 | 5/1985 | Japan | 428/116 |
| 491427 | 9/1938 | United Kingdom | 428/35 |

OTHER PUBLICATIONS

Chemical Abstracts, vol. 103, No. 20, Abstract No. 165143g, Columbus, Ohio, U.S.

Primary Examiner—Henry F. Epstein
Attorney, Agent, or Firm—Parkhurst, Oliff & Berridge

[57] ABSTRACT

A setter is disclosed which is made of ceramic honeycomb structural plate having longitudinal flow cells, and is provided with a bevelled portion at peripheral edge portion of an end face which is to be abutted against a green honeycomb structural body to be fired. A process for firing green honeycomb structural bodies by using such a setter is also disclosed.

20 Claims, 5 Drawing Sheets

FIG_13

FIG_14

FIG_15

FIG_16

FIG_17

FIG_18

SETTERS AND FIRING OF CERAMIC HONEYCOMB STRUCTURAL BODIES BY USING THE SAME

BACKGROUND OF THE INVENTION

1. Field of the Invention

The present invention relates to a setters and a process for firing green ceramic honeycomb structural bodies by using these setters.

2. Related Art Statement

In the production of ceramic articles by firing green moldings, there has been heretofore known a method of firing the green moldings on plankings or burning tools called "setters", without directly being placed on shelves, to prevent the ceramic articles from cracking or attaching to the shelves.

In order to produce ceramic honeycomb structural bodies by firing green structural bodies thereof, there have been available a method (laid posture firing) in which the green honeycomb structural bodies are fired while axes of their cells are almost horizontally oriented and a method (erected posture firing) in which the green honeycomb structural bodies are fired while the axes of the cells are approximately vertically oriented.

In the production of the ceramic honeycomb structural bodies, the honeycomb structural bodies shrink or expand in a cell axial direction and in a direction orthogonal thereto during firing. Further, it may happen that the ceramic honeycomb structural bodies deform during firing. Therefore, it may be said that the erected posture firing in which a green honeycomb structural body is fired while its open lower end is contacted with an upper face of a setter is advantageous to obtain ceramic honeycomb structural bodies having excellent dimensional accuracy, because the deformation can be suppressed to a small extent during firing.

Figure 1:
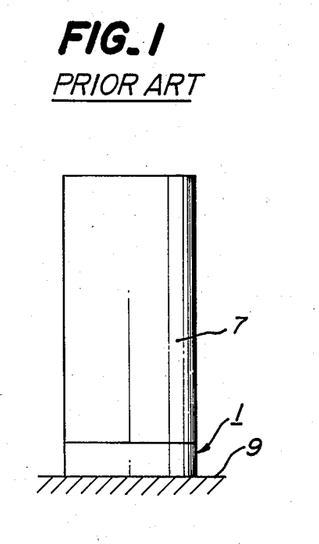
FIGS. 1 and 2 are schematic side views illustrating use states of conventional setters.
Figure 2:
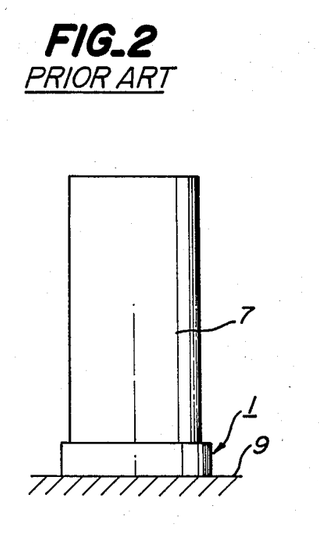

When a green honeycomb structural body is fired in the state that its open lower end face is contacted with the upper face of the setter, there is a problem that ribs of the cells of the green honeycomb structural body are cracked by a frictional resistive force developed at a contact interface between the green honeycomb structural body and the setter due to the shrinkage or the expansion during firing. This problem has become conspicuous with a recent rib-thinning tendency. In particular, as shown in FIGS. 1 and 2, when a green honeycomb structural body 7 is placed on a setter 1 which has an end shape substantially equal to that of the green honeycomb structural body and is put on a shelf 9, the outer edge portion of the green honeycomb structural body is liable to crack because of the frictional resistance discussed above. In addition, in the case of the erected posture firing, the lower end face portion and the central portion of the green honeycomb structural body near the setter are insufficiently heated. Thus, it is difficult to increase the temperature of these portions. When the green honeycomb structural body contains a binder, a foaming agent (which is added to bodies and burnt out to form pores in fired articles, for instance, graphite, wheat powder, brown coal, lime, charcoal, saw dusts, or cork powder), etc., they remain unburnt in the honeycomb structural body or the unburnt binder or foaming agent abnormally burns when the honeycomb structural body reaches a high temperature range, thereby producing cracks. When the unburnt binder, foaming agent, etc. is abruptly burnt in the honeycomb structural body, the following troubles occur.

(1) Since the inside of the honeycomb structural body expands, cracks are formed therein.
(2) Since the inside of the honeycomb structural body is abruptly heated, the inside melts.
(3) Since the inside of the honeycomb structural body is abruptly heated, the porosity and the pore diameter become different between the inner portion and the outer portion of the honeycomb structural body.

Further, the present inventors have noticed that there were the following problems in the erected posture firing:

(1) Since a gas having a higher temperature generally tends to collect upwardly, the temperature of the green honeycomb structural body is likely to become higher at the upper end face side (upward side) than at the lower end face side (downward side) (The upper end face side is likely to be more heated).
(2) Since the lower end face side contacts with the shelf or the setter, it is not exposed to a combustion gas. To the contrary, the temperature of the upper end face is likely to become higher due to its exposure to the combustion gas (The upper end face is more likely to be heated).

Therefore, the temperature may differ between the upper and lower sides of the ceramic honeycomb structural body.

If the temperature distribution is non-uniform as mentioned above, the firing shrinkage becomes non-uniform between the upper and lower side portions. As a result, the upper end face which is likely to be more heated is liable to crack. Alternatively, if non-uniform temperature distribution occurs during burning-out of the binder, the foaming agent, etc. contained in the green honeycomb structural body, an overheated portion abnormally expands. Consequently, there is a problem that the upper end face which is likely to be more heated is liable to crack.

Even if these problems attempt to be coped with by adjusting a kiln temperature distribution, gas stream, etc., the temperature distribution is difficult to control when the size of the green honeycomb structural bodies is large or when a large number of green honeycomb structural bodies are fired as in the case of a tunnel kiln. If the heating rate of the green honeycomb structural bodies is lowered to cope with the above problems, productivity becomes lower.

With respect to the laid posture firing, if the end face of the green honeycomb structural body is exposed to a combustion gas and is overheated and accordingly temperature locally rises, the temperature distribution may become non-uniform. If the temperature distribution is non-uniform, the end face which is likely to be more heated is liable to crack for the same reason as given in the erected posture firing.

SUMMARY OF THE INVENTION

It is an object of the present invention to obviate the problems encountered by the erected posture firing, and to provide a setter composed of a honeycomb structural ceramic plate with longitudinal flow cells and having a bevelled portion at an upper peripheral edge portion thereof.

According to another object of the present invention, there is a provision of a process for firing green ceramic honeycomb structural bodies by using a setter, wherein the setter is a setter composed of a honeycomb structural ceramic plate with longitudinal flow cells and having a bevelled portion at an upper peripheral edge portion thereof, and the green honeycomb structural body is fired on the setter such that an outer peripheral edge of an upper end face of the setter is located, by 3 mm or more, inside an outer peripheral edge of a lower end face of the green honeycomb structural body.

It is still another object of the present invention to provide a process for firing green ceramic honeycomb structural bodies in an erected posture or laid posture with use of a setter, wherein setters are abutted against opposite open end faces of the green ceramic honeycomb structural body and at least one of the setters is a ceramic honeycomb structural type setter.

By the present invention, the ceramic honeycomb structural bodies each having an intended dimension and uniform quality can be obtained.

These and other objects, features and advantages of the present invention will be appreciated upon reading of the following description of the invention when taken in conjunction with the attached drawings with the understanding that some modifications, variations and changes of the same could be made by the skilled person in the art to which the invention pertains without departing from the spirit of the invention or the scope of claims appended hereto.

BRIEF DESCRIPTION OF THE INVENTION

For a better understanding of the invention, reference is made to the attached drawings, wherein.

DETAILED DESCRIPTION OF THE INVENTION

Figure 3:
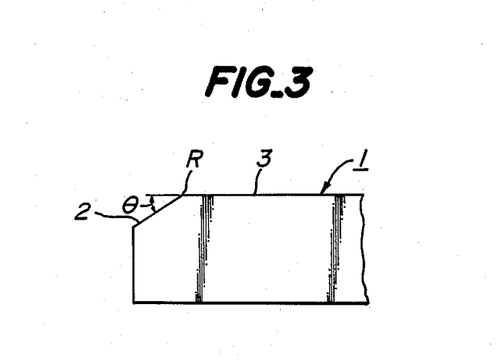
FIGS. 3 and 4 are partially side views of schematically illustrating setters according to the present invention.
Figure 4:
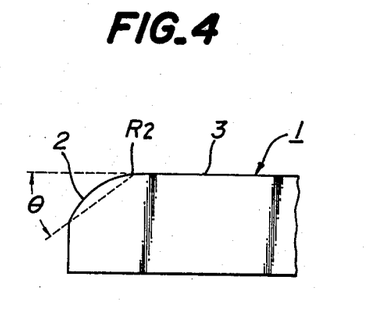
Figure 5:
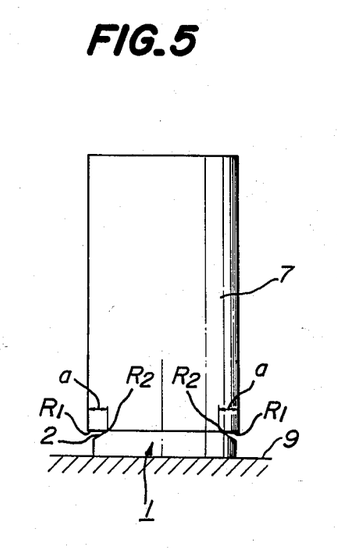
FIGS. 5 through 8 are schematic side views illustrating use states of the setters according to the present invention.
Figure 6:
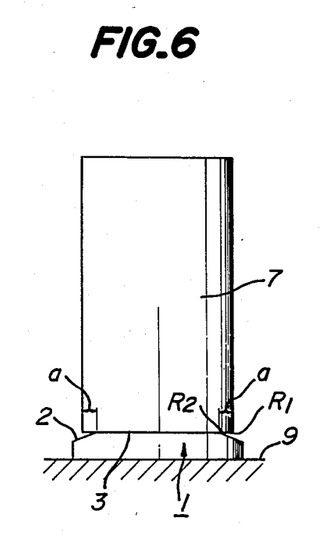
Figure 7:
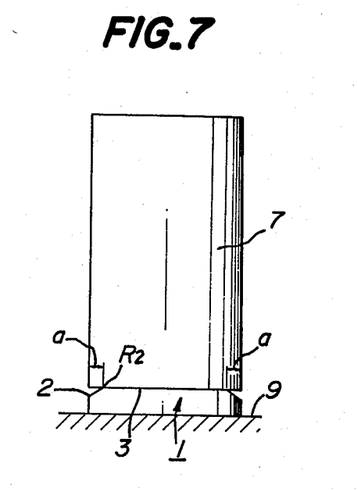

First, the setter according to the present invention will be explained in more detail with reference to FIGS. 3 and 4.

The setter 1 according to the present invention is composed of a ceramic honeycomb structural plate having longitudinal cells, and has a bevelled portion 2 at the upper end peripheral edge portion. The bevelled portion is an annular inclined portion having a bevel angle "$\theta$" of 3° to 45° as shown in FIG. 3 or an annular rounded portion as shown in FIG. 4, at the outer upper peripheral edge.

It is preferable that the bevelled portion smoothly continues to the upper flat end face or a curved peripheral face of the setter. The round surface preferably not greatly deviate from the bevelled portion having the bevel angle, $\theta$ (see FIG. 4). If the bevel angle is less than 3°, no bevelling effect can be obtained and cutting can not be avoided. On the other hand, if the bevel angle exceeds 45°, the firing shrinkage is not smoothly done at the outer peripheral edge $R_2$ of the setter, so that the ribs of the honeycomb structural body is liable to crack.

The bevelled setter contacts with the opened lower end face of the green honeycomb structural body at the upper end face excluding the bevelled portion, and stably supports it. The upper end face of the setter is designed in such a planar or curved face as to intimately contact with the open lower end face of the green honeycomb structural body.

When the setter is designed in a honeycomb structure having an open degree of about 0.8 to 310 cells/cm$^2$ (5–2,000 cells/inch$^2$), downward hot gas is well carried through the green honeycomb ceramic structural body.

Grooves in a cross-, radial-, lattice- or annular-arrangement or other arrangement may be provided in the upper face of the setter. FIGS. 9–12 show setters with such grooves 4. Reference numerals 5 and 6 denote a cell wall and a cell, respectively. In this case, it is preferable that bevelled portions are provided at the upper edge portions of ridges for the grooves. It may be that the bevel angle and the radius of curvature of the bevelled portions of the ridges are the same as or different from $\theta$ and R of the bevelled portion of the setter, respectively.

The setter may be a green setter or a fired setter to be repeatedly usable. The setter preferably has a shape such as an elliptical, round, or rectangular parallelopiped shape, etc. which meets the shape of the honeycomb structural bodies to be placed thereon.

Any ceramic material may be used for the setters so long as it does not cause any particular troubles such as cracking or adhesion.

The setters according to the present invention may be used for the production of general ceramic articles such as dishes, bowls, tiles and bricks including parts for equipments and instruments. They are particularly useful for firing green honeycomb structural bodies.

When the honeycomb structural body is to be fired by using the setter according to the present invention, it is placed on the upper end face of the setter such that the outer peripheral edge of the upper face of the setter is located, by about 3 mm, inside the outer peripheral edge of the lower end face of the green honeycomb structural body. When the distance "a" between the outer peripheral edge of the upper face of the setter and the outer peripheral edge of the lower end face of the green honeycomb structural body is shorter than about 3 mm, the honeycomb structural body is liable to crack. If the distance "a" is made too long, the outer peripheral portion of the green honeycomb structural body hangs down during firing due to its own weight, so that the dimensional precision of the end face of the honeycomb structural body may become poorer. Therefore, since the deformation degree during the firing varies depending upon the material or the structure of the green honeycomb structural body, the distance "a" has only to be set depending upon the material and the structure to prevent the hanging-over. When the green honeycomb structural body is placed on the setter such that the cell openings of the green honeycomb structural body may be in conformity with those of the setter, downward heat is well transmitted to the green honeycomb structural body through the setter, so that the green honeycomb structural body can be rapidly fired without cracking.

When the green honeycomb structural body is placed on the setter such that the lower face of the green honeycomb structural body is contacted with the upper face of the setter, the green honeycomb structural body is stably held on the bevelled setter. Therefore, the firing and handling can be easily effected. For this reason, the upper face of the setter is designed in a planar or curved shape or other shape which is in conformity with the shape of the open lower end face of the green honeycomb structural body.

When the setter having substantially the same coefficient of thermal expansion as that of the honeycomb structural body is used, a frictional resistance due to the shrinkage or expansion between the green honeycomb structural body and the setter is effectively reduced. Therefore, it is preferable that when the green honeycomb structural body is made of cordierite, the setter is also made of cordierite, while when the honeycomb structural body is made of mullite, the setter is also made of mullite. However, other combinations than recited in the above may be employed.

When a space is formed between a shelf and a setter in the firing of the green honeycomb structural bodies by interposing a spacer between the setter and the shelf, ventilation inside the green honeycomb structural body is improved due to spontaneous convection. Consequently, the green honeycomb structural body is more easily heated, uniformly. Thus, even when the green body contains a binder, a foaming agent, etc., they are easier to be burnt out. Consequently, occurrence of cracking of the honeycomb structural body due to incomplete burning of them can be reduced.

According to the present invention, since the setter is not contacted with the outer peripheral edge portion of the open lower end face of the honeycomb structural body, a frictional resistive force occurring at an interface between the green honeycomb structural body and the setter is reduced and cracking frequently occurring particularly in the outer peripheral edge portion of the open lower end face of the honeycomb structural body can be prevented. Further, the honeycomb structural body can be fully uniformly heated. Moreover, the temperature rising rate can be increased.

According to a further aspect of the present invention, when the green ceramic honeycomb structural body is intended to be fired, the setters are abutted against the opposite opened end faces of the green ceramic honeycomb structural body and a ceramic honeycomb structural setter is used as at least one of the setters. (In a strict sense, a plate, which is abutted against an upper end face of the honeycomb structural body in an erected posture or against a side end face of the honeycomb structural body in a laid posture, may not be called "setter". However, for simplification of the explanation, the term "setter" is used throughout the specification and the claims to also include such a plate.)

Therefore, in the case of the erected posture firing, the setter is also placed on the upper end face of the green honeycomb structural body where temperature is liable to locally rise and the end face is liable to crack, thereby preventing the local temperature rise at the upper end face of the green honeycomb structural body even when the upper end face is exposed to the combustion gas, etc.

In the case of the laid posture firing, the setters are abutted against open side end face of the green honeycomb structural body where temperature is liably to locally rise and the end face is liable to crack.

For instance, when an end face of the green honeycomb structural body is directed to a burner flamecoming direction and therefore is liable to be locally overheated, the setter has only to be abutted against the end face of the green honeycomb structural body on the burner side. The setter may be abutted against one or both of the open opposite side end faces of the green honeycomb structural body in the laid posture firing.

The same or similar setters as in the erected posture firing may be used in the case of the laid posture firing.

As mentioned in the above, the abutting face of the setter is designed in a planar face or a curved face or a shape which intervenes a high temperature gas from entering the opened opposite end faces of the green honeycomb structural body, when in the abutment.

The setter may be lightened by designing it as a honeycomb structural body. When the cell openings of the honeycomb structural setter are made in conformity with those of the green honeycomb structural body, gases generated when the binder and the foaming agent are burnt out are easily dissipated to readily remove the binder, the foaming agent, etc. This can be said to both the erected posture firing and the laid posture firing.

Any ceramic material may be used for the setters so long as the green honeycomb structural bodies are not cracked, broken or adhered. As mentioned above, it is preferable that the coefficient of thermal expansion is substantially equal between the setter and the green honeycomb structural body. If so, the green honeycomb structural body can be prevented from cracking due to expansion and shrinkage during the firing. For instance, the same ceramic material as the green honeycomb structural body is preferably used for the setter. Thus, when the green honeycomb structural body is mullite, the setter is made of mullite, while when the former is cordierite, the latter is made of cordierite.

The open degree of the honeycomb structural setter may be about 0.8 to 310 cells/cm$^2$ (5 to 2,000 cells/cm$^2$).

Preferably, the sectional size of the setter is substantially the same as that of the green honeycomb structural body and the thickness of the setter is selected under due consideration of the temperature or temperature distribution of the green honeycomb structural body during firing as well as its weight.

In the case of the erected posture firing, when the setter placed on the upper end face of the green honeycomb structural body is too heavy, a frictional force of the green honeycomb structural body at the lower end face becomes too larger on shrinkage or expansion during the firing. Consequently, this causes cracking of the honeycomb structural body. Thus, needless to say, the lighter the setter placed on the upper end face of the green honeycomb structural body, the better the result.

As discussed in the above, when the outer periphery of an abutting face of the setter is bevelled and the setter is abutted against the open end face of the green honeycomb structural body such that the outer peripheral edge of the abutting face is located, by 3 mm or more, ordinarily, from 5 to 15 mm, inside of the outer peripheral edge of the open end face of the green honeycomb structural body, a frictional resistive force developed between the open end face of the green honeycomb structural body and the setter due to shrinkage or expansion during the firing can be reduced, and the open end face of the green honeycomb structural body can be prevented from cracking due to the frictional force.

Thus, the above bevelling has a great effect of preventing the cracking of the green honeycomb structural body in the erected posture firing in which the frictional resistive force between the setter and the open end face of the green honeycomb structural body is larger.

As having been discussed, the bevelled portion may be formed at a bevel angle θ of 3° to 45°, or rounded near at this bevel angle.

When a groove is formed in the abutting face of either or both of the setters while extending up to the bevelled portion, such effects similar to those obtained in the case of the honeycomb structural setter can be obtained that the flowing of the heating gas is smooth; and the temperature can be raised more speedly. When bevelled portions are provided at upper edge portions of ridges for the grooves, cracking of the green honeycomb structural body during the firing can be further decreased. It may be that the bevel angle and the radius of curvature of the bevelled portions of the ridges may be the same as those in the bevelled portion of the setter, but the former may be different from the latter.

As the setter, use may be made of a green setter or a fired setter. The setter preferably has a shape to be in conformity with the shape of the green honeycomb structural body to be abutted against, for instance, an elliptical shape, a round shape, a rectangular parallelogramic shape, etc.

As the setter, use may be made of honeycomb structural bodies shown in FIGS. 9-12 having grooves.

In the case of the erected posture firing of the green honeycomb structural body, when a spacer is interposed between the lower setter and a shelf, the ventilation can be improved to shorten the firing time and reduce the cracking of the honeycomb structural body.

According to the present invention, since the setters are brought into contact with the opposite open end faces of the green honeycomb structural body during firing, the cracking of the green honeycomb structural body at the end faces due to the non-uniform temperature distribution originating from the overheating can be prevented. Further, since the temperature can be rapidly raised and the firing can be effected under a uniform temperature distribution, the productivity can be improved.

Figure 8:
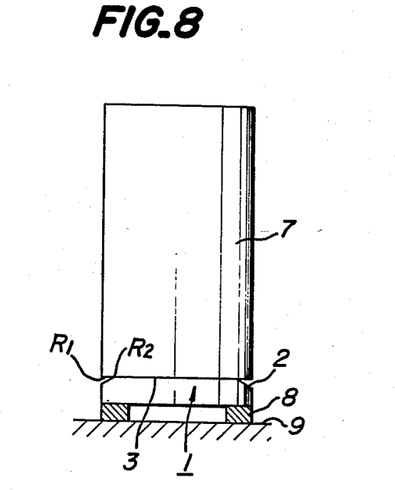
Figure 9:
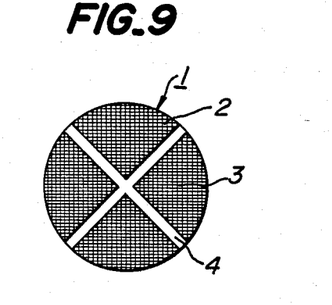
FIGS. 9 through 11 are schematic plane views illustrating other embodiments of the setter according to the present invention.
Figure 10:
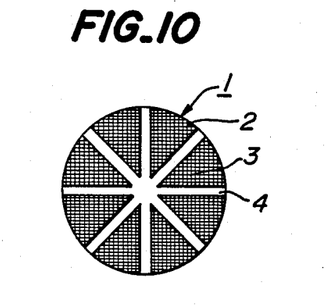
Figure 11:
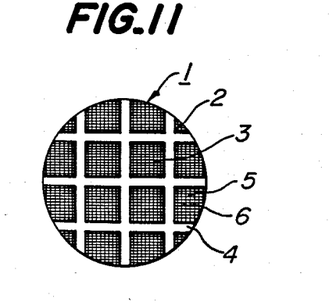
Figure 12:
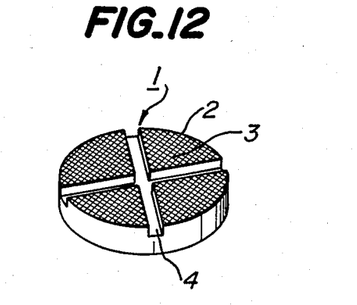
FIG. 12 is a perspective view illustrating the setter shown in FIG. 9.
Figure 13:
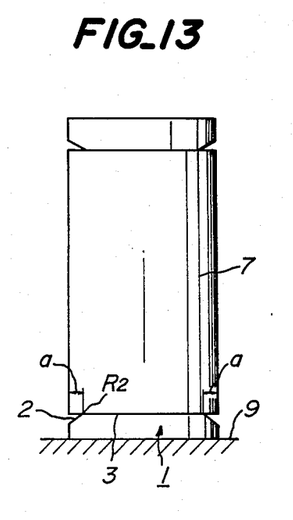
FIGS. 13 through 17 are schematic side views illustrating examples of the ceramic honeycomb structural body-firing process according to the present invention.
Figure 14:
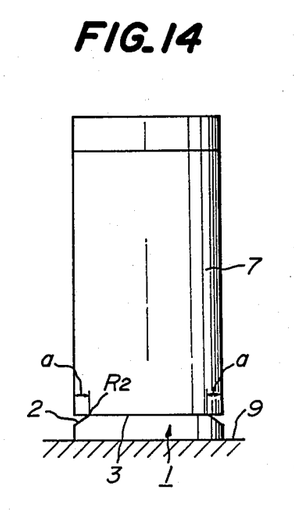
Figure 15:
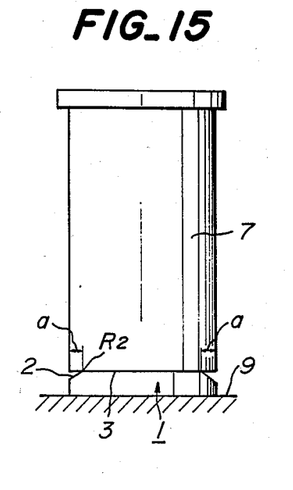
Figure 16:
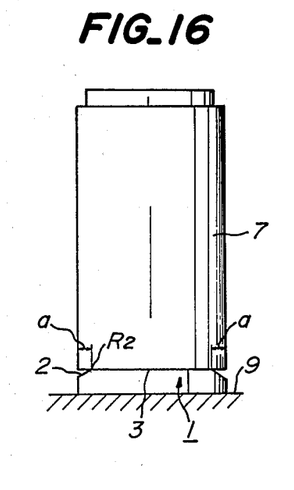
Figure 17:
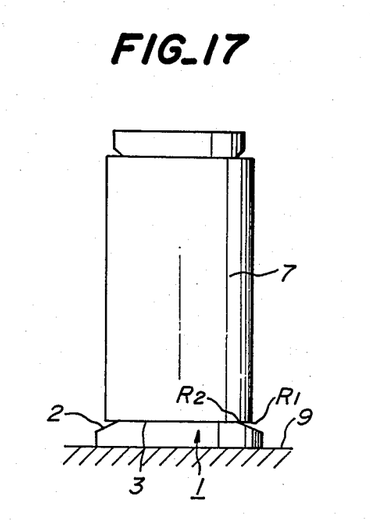

The present invention will be explained in more detail with reference to the following specific examples. However, these examples are merely given in illustration of the invention, but should not be interpreted to limit the scope of the invention. Examples 1-9 and Comparative Examples 1-3 (which were conducted to explain the effect of the figures of setters on firing or sintering green ceramic honeycomb bodies):

Setters of 12 types shown in the following Table were prepared by molding or firing. The setter Nos. 2-9 and Nos. 11-12 each had an annular bevelled portion 2 at the upper peripheral edge portion thereof. The bevelled portion 2 was contacted with the upper end face 3 at an outer peripheral edge $R_2$. The setter No. 1 and No. 10 had no bevelled portion. Three kinds of green ceramic honeycomb structural bodies 7 were extruded and prepared shown in the Table 1. Then, these prepared bodies 7 were sintered by using the setter 1. Run Nos. 1 and 3, Nos. 2 and 4, No. 5, Nos. 6-9, No. 10 and Nos. 11-12 were sintered as shown in FIG. 2, FIG. 6, FIG. 8, FIG. 7, FIG. 1 and FIG. 5, respectively. During the sintering, the outer peripheral edge $R_2$ of the upper end face of the setter 1 was located, by a distance "a"=5 to 15 mm, inside the outer peripheral edge $R_1$ of the open lower end face of the green honeycomb structural body 7. The thus obtained fired honeycomb structural bodies suffered almost no cracks. When the setter 1 was placed on a shelf plate 9 via a spacer 8 as shown in FIG. 8, almost no cracks occurred. Results are shown in Table 1 together with those of Comparative Examples 1, 2 and 3.

firing, the cracking of the green honeycomb structural

TABLE 1(a)

| No. | | Type | Green honeycomb structural body | | | |
|---|---|---|---|---|---|---|
| | | | Sectional Shape; dimension mm | Cell density cells/cm² | Wall thickness mm | Material |
| 1 | Comparative Example 1 | 1 | round: 120Φ × 150 long | 62 | 0.15 | cordierite |
| 2 | Example 1 | " | " | " | " | " |
| 3 | Example 2 | " | " | " | " | " |
| 4 | Example 3 | " | " | " | " | " |
| 5 | Example 4 | " | " | " | " | " |
| 6 | Comparative Example 2 | 2 | $C_1$ | " | " | " |
| 7 | Example 5 | " | " | " | " | " |
| 8 | Example 6 | " | " | " | " | " |
| 9 | Example 7 | " | " | " | " | " |
| 10 | Comparative Example 3 | " | " | " | " | " |
| 11 | Example 8 | 3 | round: 90Φ × 120 long | 46.5 | 0.3 | mullite |
| 12 | Example 9 | " | " | " | " | " |

TABLE 1(b)

| No. | Type | Setter Sectional shape; dimension mm | Cell density cells/cm² | Wall thickness mm | Material | Kind | a mm | Bevel angle θ° | Radius of curvature at bevelled portion | Crack rate % |
|---|---|---|---|---|---|---|---|---|---|---|
| 1 | 1 | round: 124Φ × 20 thick | 62 | 0.15 | cordierite | A | 0 | 0 | 0 | 25 |
| 2 | 2 | " | " | " | " | " | 3 | 15 | — | 0.5 |
| 3 | 3 | " | " | " | " | " | 5 | — | 20 | 0.5 |
| 4 | 4 | " | " | " | " | A' | −5 | — | " | 0 |
| 5 | 5 | " | " | " | " | B | 5 | — | " | 0 |
| 6 | 6 | $C_2$ | " | " | " | A | 10 | 60 | — | 30 |
| 7 | 7 | $C_2$ | " | " | " | " | 10 | 45 | — | 1 |
| 8 | 8 | $C_2$ | " | " | " | " | 10 | 30 | — | 0 |
| 9 | 9 | $C_2$ | " | " | " | " | 10 | 3 | — | 0 |
| 10 | 10 | $C_2$ | " | " | " | " | 0 | 0 | — | 25 |
| 11 | 11 | round: 88Φ × 20 thick | 46.5 | 0.3 | mullite | A | 5 | — | 10 | 0 |

TABLE 1(b)-continued

| No. | Type | Setter Sectional shape; dimension mm | Cell density cells/cm² | Wall thickness mm | Material | Kind | a mm | Bevel angle θ° | Radius of curvature at bevelled portion | Crack rate % |
|---|---|---|---|---|---|---|---|---|---|---|
| 12 | 12 | " | " | " | " | " | 15 | 15 | — | 0 |

Note:
A ... fired setter to be repeatedly usable
A' ... fired setter to be repeatedly usable and spacer interposed
B ... green setter
C₁ ... elliptical: (major axis × minor axis × long) → 145 × 81 × 150
C₂ ... elliptical: (major axis × minor axis × thickness) → 145 × 81 × 30

Figure 18:
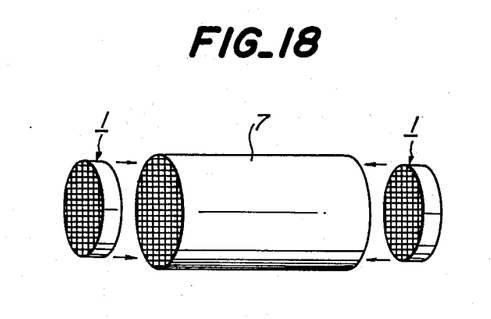
FIG. 18 is an exploded perspective view of other example of the firing process according to the present invention in the case of the laid posture firing.

As understood from the above, according to the present invention, the crack-free ceramic articles each having an intended dimension and a uniform quality can be obtained. In particular, the ceramic honeycomb structural bodies having complicated shapes, precise dimensions and uniform quality can be speedly obtained at a high yield. Further, the weight of the setter can be reduced by designing it in a honeycomb structure. Examples 10 to 17 and Comparative Examples 4–5 (which were conducted as to how to sinter the green ceramic honeycomb structural body by means of the setter):

Setters having respective shapes, dimensions, structures and materials shown in Table 2 were obtained. After preparing the green ceramic honeycomb structural bodies 7, said bodies 7 were sintered in combination with the setters as shown in Table 2(b) and 2(c). In Run Nos. 13 to 19 in Table 2, honeycomb structural bodies were sintered in the erected posture by using the setters. Run Nos. 13, 14 to 17, 18 and 19 were sintered as shown in FIG. 1, FIGS. 13 to 16, FIG. 6 and FIG. 17, respectively. In Run Nos. 20 to 22 in Table 2, honeycomb structural bodies were sintered in the laid posture by using setters. Run Nos. 21 to 22 were sintered as shown in FIG. 18. The outer peripheral edge $R_2$ of the abutting face 3 of the setter 1 was located, by a distance "a" of not less than 3 mm, ordinarily from 5 to 15 mm, inside the outer peripheral edge of the open end face of the green honeycomb structural body 7. As shown in Table 2, the honeycomb structural bodies thus fired suffered completely no cracks. When a green honeycomb structural body was fired in the laid posture while the setters having no bevelled portion 2 were brought into contact with the right and left sides (FIG. 18), the cracking of the sintered honeycomb structural body was prevented. But, the precision in the shape and the dimension was higher in the erected posture firing than in the laid posture firing.

TABLE 2(a)

| No. | | | Green honeycomb structural body Sectional shape; dimension (mm) | Cell density cells/cm² | Wall thickness (mm) | Material |
|---|---|---|---|---|---|---|
| 13 | Erected posture firing | Comparative Example 4 | 140Φ × 150 long | 62 | 0.15 | cordierite |
| 14 | | Example 10 | " | " | " | " |
| 15 | | Example 11 | " | " | " | " |
| 16 | | Example 12 | " | " | " | " |
| 17 | | Example 13 | " | " | " | " |
| 18 | | Example 14 | 140Φ × 150 long | 46 | 0.3 | mullite |
| 19 | | Example 15 | " | " | " | " |
| 20 | Laid posture firing | Comparative Example 5 | 200Φ × 600 long | 62 | 0.15 | cordierite |
| 21 | | Example 16 | " | " | " | " |
| 22 | | Example 17 | " | " | " | " |

TABLE 2(b)

| No. | | | Upper or left side setter Shape; dimension (mm) | Plate or honeycomb | Structure Cell density cells/cm² | Wall thickness (mm) | Bevel angle | Material |
|---|---|---|---|---|---|---|---|---|
| 13 | Erected posture firing | Comparative Example 4 | — | — | — | — | — | — |
| 14 | | Example 10 | 140Φ × 5 thick | plate | — | — | 30° | cordierite |
| 15 | | Example 11 | 140Φ × 20 thick | honeycomb | 62 | 0.15 | — | " |
| 16 | | Example 12 | 150Φ × 10 thick | " | " | " | — | " |
| 17 | | Example 13 | 120Φ × 10 thick | honeycomb | 46 | 0.3 | — | mullite |
| 18 | | Example 14 | — | — | — | — | — | — |
| 19 | | Example 15 | 100Φ × 10 thick | honeycomb | 62.5 | 0.15 | — | cordierite |
| 20 | Laid posture firing | Comparative Example 5 | — | — | — | — | — | — |
| 21 | | Example 16 | 120Φ × 5 thick | plate | — | — | — | cordierite |
| 22 | | Example 17 | 120Φ × 10 thick | honeycomb | 62 | 0.15 | — | " |

TABLE 2(c)

| No. | | | Upper or left side setter Shape; dimension (mm) | Plate or honeycomb | Structure Cell density cells/cm² | Wall thickness (mm) | Bevel angle | Material | Crack rate (%) |
|---|---|---|---|---|---|---|---|---|---|
| 13 | Erected posture firing | Comparative Example 4 | 140Φ × 20 thick | plate | — | — | — | cordierite | 25 |
| 14 | | Example 10 | " | honeycomb | 62 | 0.15 | 30° | " | 0 |
| 15 | | Example 11 | " | " | " | " | " | " | 0 |

TABLE 2(c)-continued

| No. | | | Shape; dimension (mm) | Upper or left side setter Structure Plate or honeycomb | Cell density cells/cm² | Wall thickness (mm) | Bevel angle | Material | Crack rate (%) |
|---|---|---|---|---|---|---|---|---|---|
| 16 | | Example 12 | " | " | " | " | " | " | 0 |
| 17 | | Example 13 | " | " | " | " | " | " | 0 |
| 18 | | Example 14 | 144Φ × 20 thick | honeycomb | 46 | 0.13 | 15° | mullite | 2 |
| 19 | | Example 15 | " | " | " | " | " | " | 0 |
| 20 | Laid | Comparative Example 5 | — | — | — | — | — | — | 25 |
| 21 | posture firing | Example 16 | 120Φ × 20 thick | honeycomb | 62 | 0.15 | — | cordierite | 0 |
| 22 | | Example 17 | " | " | " | " | — | " | 0 |

According to the present invention, the honeycomb structural bodies having complicated shapes, precise dimensions and uniform qualities can be easily obtained in a short time at high yield without cracks, and thus the present invention largely contributes to the industries.

As a matter of course, various modifications, changes and variations of the present invention can be made without departing from the spirit of the invention or the scope of claims appended hereto.

What is claimed is:

1. A setter used for firing a ceramic honeycomb structural body, comprising a honeycomb structural ceramic plate having a top surface and a bottom surface, longitudinal flow cells passing through said plate in a perpendicular direction to the surfaces, and a bevelled portion at an outer peripheral edge portion of said top surface, wherein said top surface contacts a substantial portion of an end face of the honeycomb structural body.

2. A setter according to claim 1, wherein an open degree of the honeycomb structure of said plate is from 0.8 to 310 cells/cm² (from 5 to 2,000 cells/inch²).

3. A setter according to claim 1, wherein a groove is provided in said top surface.

4. A process for firing a green honeycomb structural body by using a setter, wherein the setter is made of a honeycomb structural ceramic plate having a top surface, a bottom surface, longitudinal flow cells passing through said plate in a perpendicular direction to the surface, and a bevelled portion at an outer peripheral edge portion of said top surface, said green honeycomb structural body being fired on the setter while an outer peripheral edge of said top surface contacts an end face of the green honeycomb structural body at a portion of said end face which is inwardly spaced from an outer peripheral surface of said body by a distance of at least 3.0 mm.

5. A firing process according to claim 4, wherein the green honeycomb structural body is fired while the cell openings of the green honeycomb structural body are made such that the openings conform with those of the honeycomb structural setter.

6. A firing process according to claim 4, wherein an open degree of the honeycomb structure of the setter is from 0.8 to 310 cells/cm² (from 5 to 2,000 cells/inch²).

7. A firing process according to claim 4, wherein a groove is provided in the upper end face of the setter.

8. A firing process according to claim 4, wherein a spacer is interposed between the setter and a shelf on which the setter is to be placed.

9. A process for firing a green ceramic honeycomb structural body by using setters, comprising firing the body while the setters are brought into contact with opposite open end faces of the green honeycomb structural body, wherein said setters comprise at least one bevelled ceramic honeycomb structural setter.

10. A firing process according to claim 9, wherein cell openings of the honeycomb structure of the setter are made to conform with those of the green ceramic honeycomb structural body.

11. A firing process according to claim 9, wherein the setters are made of the same material as that of the green honeycomb structural body.

12. A firing process according to claim 9, wherein said bevelled portion is provided at an outer periphery of an end face of said at least one of the setters which contacts the green honeycomb structural body.

13. A firing process according to claim 12, wherein the firing is effected while an outer peripheral edge of said end face of at least one of the setters is inwardly spaced from an outer peripheral surface of said honeycomb structural body by a distance of at least 3 mm.

14. A firing process according to claim 9, wherein a groove is provided in an end face of at least one of the setters which contacts said green honeycomb structural body.

15. A setter according to claim 1, wherein said bevelled portion is bevelled at an angle between 3°–45° from a plane of said top surface.

16. A setter according to claim 1, wherein said setter comprises substantially the same material as the ceramic honeycomb structural body.

17. A process according to claim 4, wherein said distance is in the range of 5–15 mm.

18. A process according to claim 13, wherein said distance is in the range of 5–15 mm.

19. A process according to claim 4, wherein said bevelled portion is bevelled at an angle between 3°–45° from a plane of said top surface.

20. A process according to claim 12, wherein said bevelled portion is bevelled at an angle between 3°–45° from a plane of said top surface.

* * * * *